(12) United States Patent
Willman et al.

(10) Patent No.: US 6,745,306 B1
(45) Date of Patent: Jun. 1, 2004

(54) METHOD AND SYSTEM FOR RESTRICTING THE LOAD OF PHYSICAL ADDRESS TRANSLATIONS OF VIRTUAL ADDRESSES

(75) Inventors: Bryan M. Willman, Kirkland, WA (US); Paul England, Bellevue, WA (US); John D. DeTreville, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/520,203

(22) Filed: Mar. 7, 2000

Related U.S. Application Data

(60) Provisional application No. 60/146,288, filed on Jul. 29, 1999.

(51) Int. Cl.[7] .............................................. G06F 12/14
(52) U.S. Cl. ........................ 711/163; 711/135; 711/206; 711/207
(58) Field of Search ................................ 711/163, 206, 711/207, 135

(56) References Cited

U.S. PATENT DOCUMENTS

| | | | | |
|---|---|---|---|---|
| 5,255,379 A | * | 10/1993 | Melo | 711/202 |
| 5,787,494 A | * | 7/1998 | DeLano et al. | 711/206 |
| 6,112,285 A | * | 8/2000 | Ganapathy et al. | 711/207 |
| 6,321,314 B1 | * | 11/2001 | Van Dyke | 711/163 |
| 6,324,635 B1 | * | 11/2001 | Van Dyke | 711/207 |

OTHER PUBLICATIONS

Intel Corporation. *Pentium® Processor Family Developer's Manual.* 1997.
Intel Corporation, *Intel Architecture Software Developer's Manual: Basic Architecture.* vol. 1, 1999.

* cited by examiner

Primary Examiner—Mano Padmanabhan
Assistant Examiner—Jasmine Song
(74) Attorney, Agent, or Firm—Leydig, Voit & Mayer, Ltd.

(57) ABSTRACT

A method and system for protecting data on a computer system uses one or more restricted areas of memory to store proprietary or confidential data. The translation lookaside buffer (TLB) is used to regulate access to the restricted memory. When a TLB miss occurs during the execution of a program, the TLB miss handling logic determines whether the program is attempting to access restricted memory. If so, then the TLB miss handling logic determines whether the program is authorized to have access. If the program is not authorized to have access, then the TLB miss handling logic generates an exception, such as an invalid page fault, and the TLB is not loaded. If the program is authorized to have access to the restricted page, then the TLB is loaded with the appropriate address translation. As long as the translation remains in the TLB, future accesses to the page by an authorized program will require no additional checks and no additional CPU time.

17 Claims, 4 Drawing Sheets

METHOD AND SYSTEM FOR RESTRICTING THE LOAD OF PHYSICAL ADDRESS TRANSLATIONS OF VIRTUAL ADDRESSES

CROSS REFERENCE TO RELATED APPLICATIONS

This application claims the benefit of U.S. Provisional Application No. 60/146,288, filed on Jul. 21, 1999.

TECHNICAL FIELD

This invention relates generally to microprocessor architecture and more particularly to a method and system for protecting data on a computer system by monitoring loads of the translation lookaside buffer.

BACKGROUND

When multiple user processes execute on a computer system, the operating system helps the CPU to prevent memory conflicts by prohibiting each user process from accessing the address space of other user processes. The operating system and other kernel mode programs may, on the other hand, access the memory of any of the user processes. This unrestricted memory-accessing ability makes it possible for the operating system or other kernel mode programs to be used to copy proprietary or confidential data from any user process and allows someone to use the data in an unethical or unauthorized way. If the data are a movie, for example, a video pirate could make and sell multiple copies. In another example, a thief could steal credit card information from a consumer's electronic-commerce application and use the information to make unauthorized charges.

While it is theoretically possible to develop and test an operating system that is completely trustworthy and unable to be used for such purposes, modem operating systems are so large (around 33 million lines of code in the case of the MICROSOFT WINDOWS 2000-brand operating system) and change so quickly that this approach is impractical. Furthermore, requiring an entire operating system to be verified would make it difficult to add new kernel-mode drivers, components, and other features. Finally, even a verified operating system can only protect against software-based attacks on data. A malicious user may be able to steal data from memory by circumventing the operating system entirely. Thus, it can be seen that there is a need for an improved method and system for protecting data on a computer system.

SUMMARY OF THE INVENTION

In accordance with this need, a method and a system for protecting data on a computer system are provided. According to the method and system, one or more restricted areas of memory in which proprietary or confidential data may safely be stored are provided. A translation lookaside buffer (TLB) is used to regulate access to the restricted memory. When a TLB miss occurs during the execution of a program, the TLB-miss handling logic determines whether the program is attempting to access restricted memory and whether it is authorized to do so. Since handling a TLB miss is already a time-consuming process, the additional time required to make such a determination will be negligible in comparison. If the program is not authorized to have access, then the TLB-miss handling logic generates an exception, such as an invalid page fault, and the TLB is not loaded. If the program is authorized to have access to the restricted memory, then the TLB is loaded with the appropriate address translation. As long as the translation remains in the TLB, future accesses to the restricted memory by an authorized program will require no additional checks and no additional CPU time. to have access to the restricted memory, then the TLB is loaded with the appropriate address translation. As long as the translation remains in the TLB, future accesses to the restricted memory by an authorized program will require no additional checks and no additional CPU time.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE PREFERRED EMBODIMENTS

Figure 1:
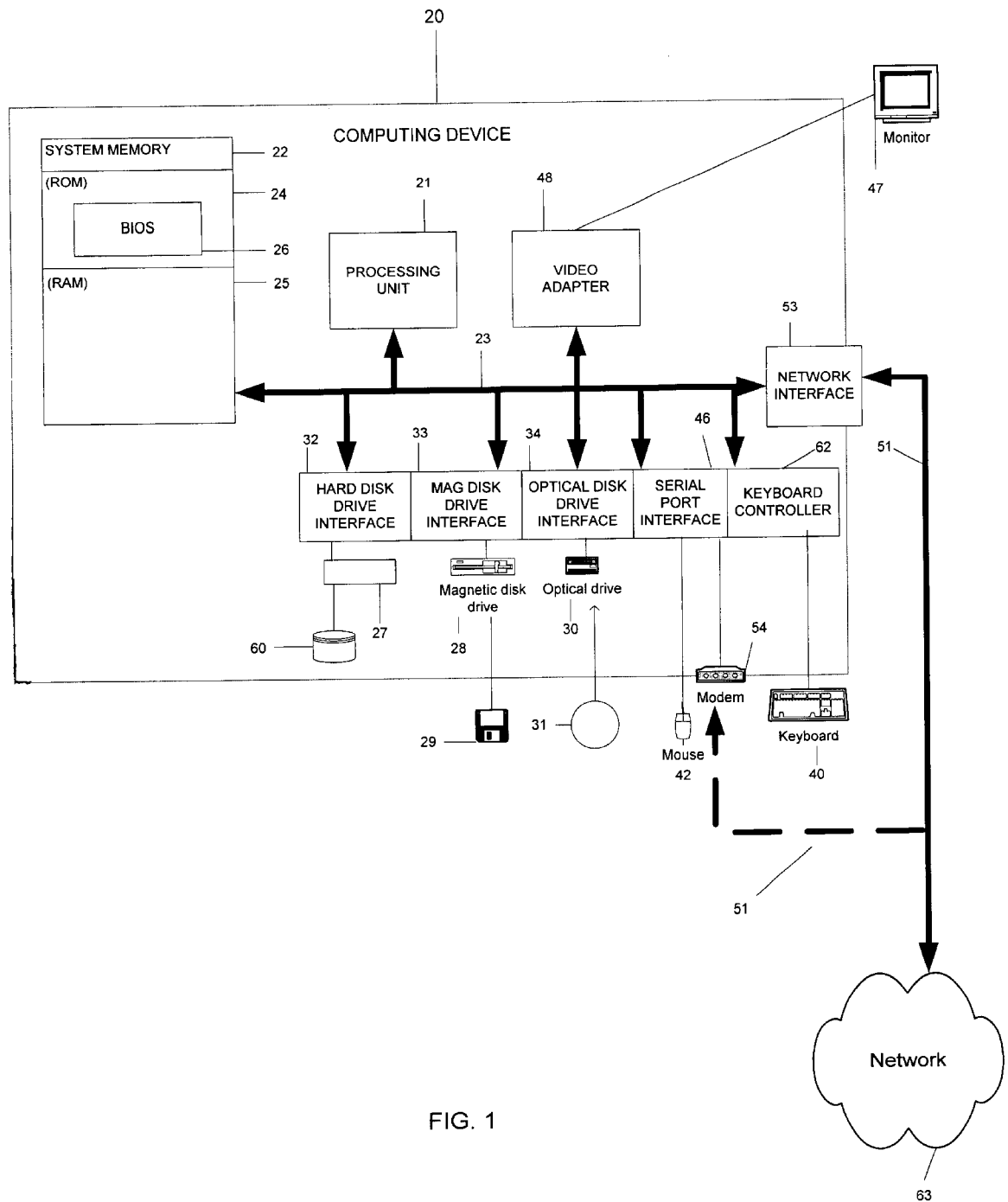
FIG. 1 is a block diagram generally illustrating an exemplary computer environment in which the present invention may be used.

Turning to the drawings, wherein like reference numerals refer to like elements, an exemplary environment for implementing the invention is shown in FIG. 1. The environment includes a general-purpose computing device 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random-access memory (RAM) 25. A basic input/output system (BIOS) 26, containing the basic routines that help to transfer information between elements within the computing device 20, such as during start-up, is stored in the ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, programs, and other data for the computing device 20. Although the exemplary environment described herein employs a hard disk 60, a removable magnetic disk 29, and a removable optical disk 31, it will be appreciated by those skilled in the art that other types of computer-readable media which can store data accessible by a computer, such as magnetic cassettes, flash memory cards, digital video disks, Bernoulli cartridges, random-access memories, read-only memories, and the like, may also be used in the exemplary operating environment.

A user may enter commands and information into the computing device 20 through input devices such as a keyboard 40, which is typically connected to the computing device 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically is include other peripheral output devices, not shown, such as speakers and printers.

The computing device 20 may operate in a networked environment using logical connections to one or more devices within a network 63, including another computing device, a server, a network PC, a peer device, or other network node. These devices typically include many or all of the elements described above relative to the computing device 20. The logical connections depicted in FIG. 1 include a land-based network link 51, for which there are many possible implementations, including a local area network (LAN) link and a wide area network (WAN) link. Land-based network links are commonplace in offices, enterprise-wide computer networks, intranets, and the Internet and include such physical implementations as coaxial cable, twisted copper pairs, fiber optics, and the like. Data may be transmitted over the network link 51 according to a variety of well known transport standards including Ethernet, SONET, DSL, T-1, and the like. When used in a LAN, the computing device 20 is connected to the network link 51 through a network interface card or adapter 53. When used in a WAN, the computing device 20 typically includes a modem 54 or other means for establishing communications over the network link 51, as shown by the dashed line. The modem 54, which may be internal or external, is connected to the system bus 23 via the serial port interface 46. In a networked environment, programs depicted relative to the computing device 20, or portions thereof, may be stored on other devices within the network 63.

Those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

In the description that follows, the invention will be described with reference to acts and symbolic representations of operations that are performed by one or more logic elements. As such, it will be understood that such acts and operations may include the execution of micro-coded instructions as well as the use of sequential logic circuits to transform data or to maintain them at locations in the memory system of the computer. Reference will also be made to one or more programs executing on a computer system or being executed by parts of a CPU. A "program" is any instruction or set of instructions that can execute on a computer, including a process, procedure, function, executable code, dynamic-linked library (DLL), applet, native instruction, module, thread, or the like. However, while the invention is being described in the context of software, it is not meant to be limiting as those of skill in the art will appreciate that various of the acts and operations described hereinafter may also be implemented in hardware.

Figure 2:
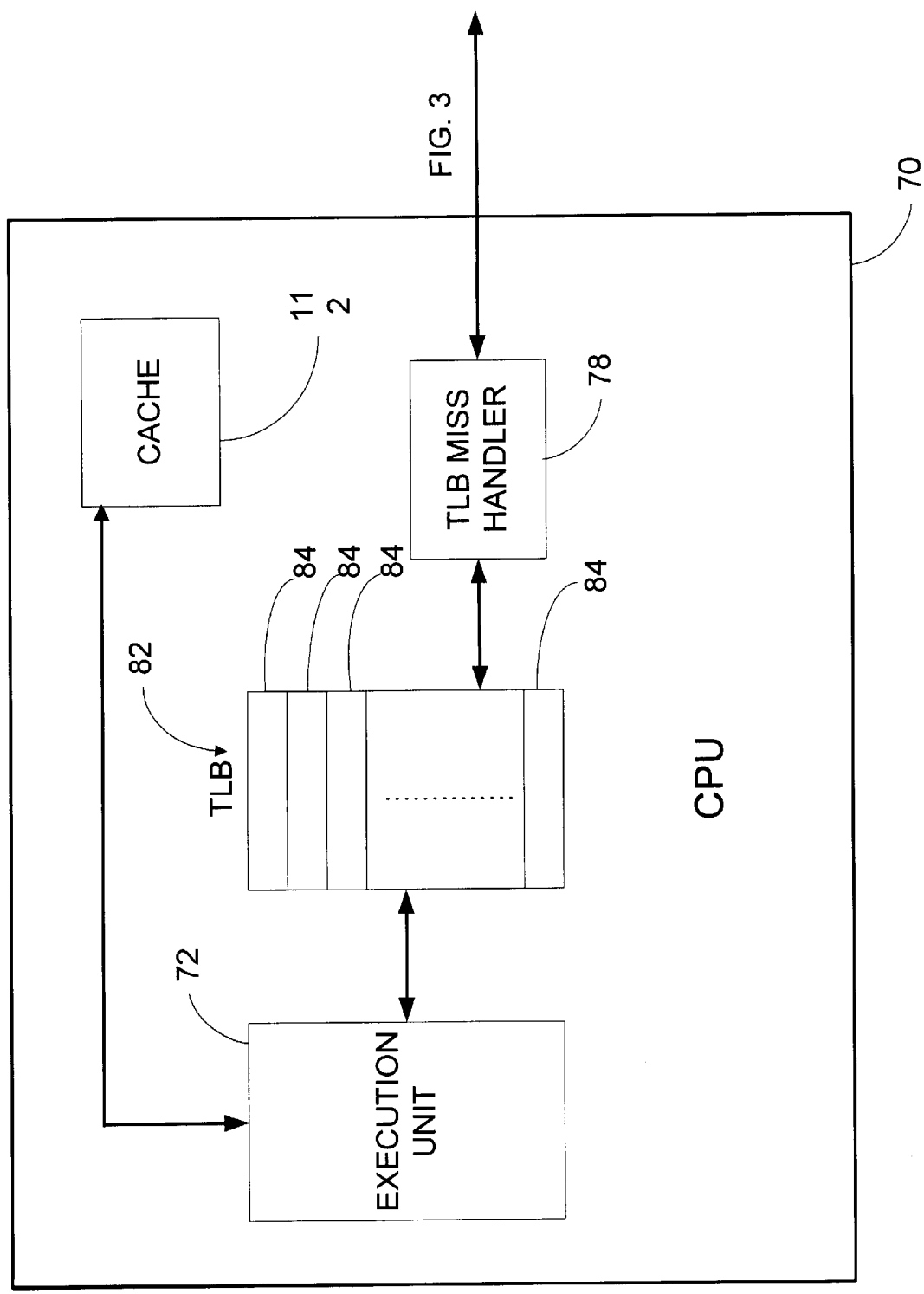
FIGS. 2 and 3 are connected block diagrams generally illustrating an exemplary CPU and memory elements configured in accordance with a preferred embodiment.
Figure 3:
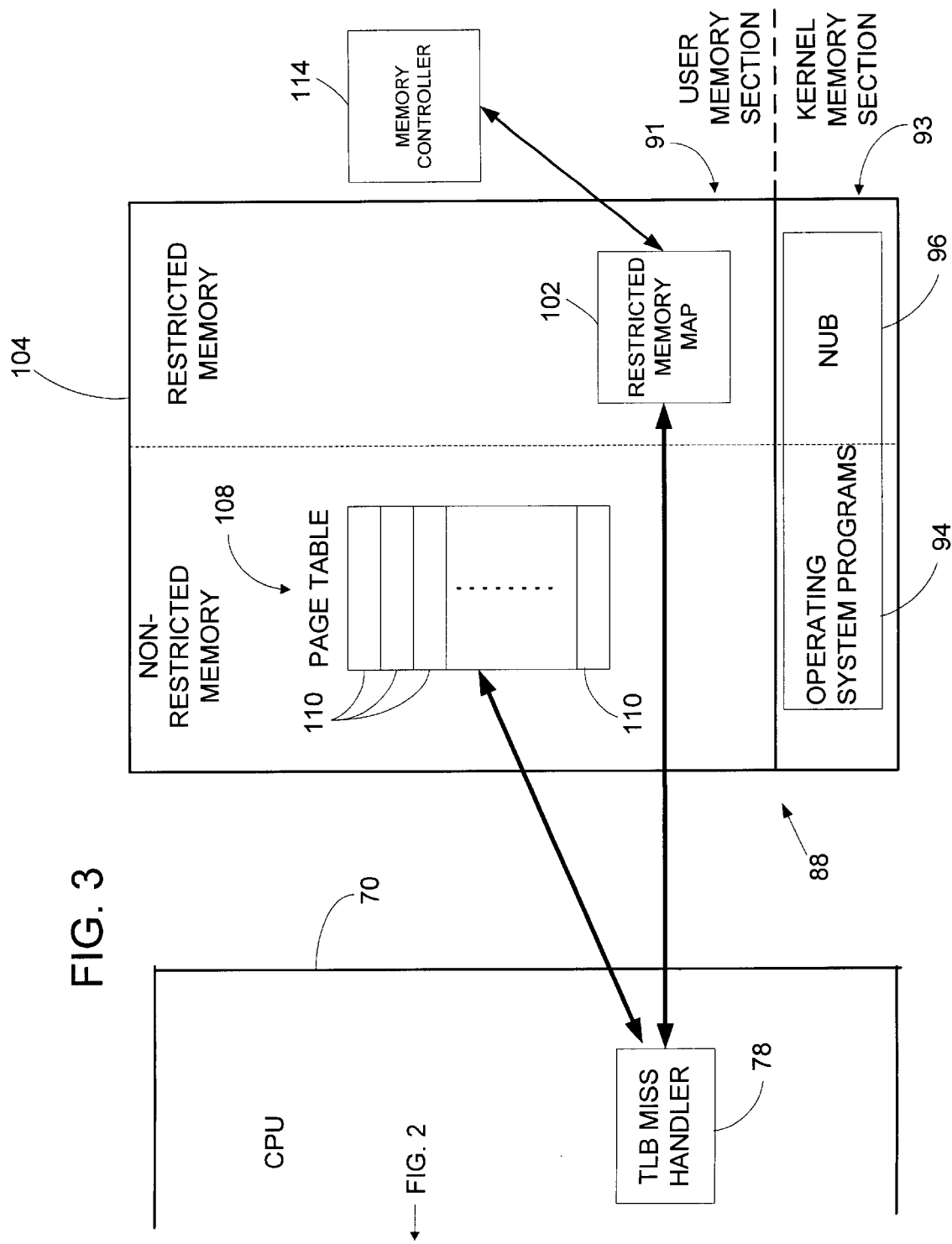

Referring to FIGS. 2 and 3, a computer system in which a preferred embodiment of the invention may be implemented is shown. The computer system has a CPU 70, a memory 88 for storing computer-readable instructions and data, and a memory controller 114 for performing direct memory access (DMA) operations on the memory 88. The memory 88 may be any computer-readable medium, including a random-access memory (RAM), read-only memory (ROM), magnetic cassette, flash memory, magnetic disk memory, digital video disk, or any combination thereof. To give one or more programs access to the memory 88, the computer system uses a virtual addressing scheme. In this scheme, a program executing on the system may issue read and write commands using one or more paged virtual addresses. If a program is authorized to access the requested memory location, then the computer system translates the virtual addresses into physical page addresses and provides them to the program.

As best shown in FIG. 2, the CPU 70 has an execution unit 72 for executing instructions and manipulating data according to the instructions. The execution unit 72 may include many sub-components, such as an arithmetic logic unit, floating point unit, barrel shifter, address generator, segmentation unit, page unit, memory interface, and the like. The CPU 70 may also include an internal cache 112 and may have access to an external cache (not shown). The CPU 70 also includes a translation lookaside buffer (TLB) 82 for storing the most recent virtual-to-physical page translations as TLB entries 84, and a TLB miss handler 78 for handling TLB misses. The TLB 82 may also have associated control logic (not shown) for performing searches of the TLB entries 84 and for reacting to requests for physical addresses from other components of the CPU 70. Additionally, the TLB miss handler 78 may be an integral part of the TLB 82 even though it is illustrated as being separate in FIG. 2. The TLB miss handler may also be implemented in software.

Referring to FIG. 3, the memory 88 is divided into a user memory section 91 and a kernel memory section 93. This division may be physical or logical depending on the particular design of the memory 88. At least one page table 108 is located in the memory 88. The page table 108 contains a Page Table Entry (PTE) 10 for each virtual memory page. Each PTE 110 contains a pointer to the physical address of the corresponding virtual memory page as well as means for designating whether the page is available, such as a valid bit. If the page referenced in a PTE 110 is currently available, then the valid bit is typically set to one. If the page is not available, then the valid bit is typically set to zero.

During operation of the computer system, programs 94 of an operating system are stored in the kernel memory section of the memory 88. These operating system programs 94 perform a variety of well known tasks and may be executed as needed. The kernel-mode section 93 of the memory 88 also contains a nub 96 which comprises a trusted sub-set of the operating system programs 94. One embodiment of the nub 96 is described in U.S. Pat. No. 6,330,670, "Digital Rights Management Operating System", which is incorporated herein by reference in its entirety.

To prevent unauthorized kernel-mode or user-mode programs from accessing proprietary or confidential data (hereinafter referred to as "protected content") according to a preferred embodiment of the invention, at least one portion of the memory 88 is reserved for the secured storage of the protected content and designated as a restricted memory 104. Although the restricted memory 104 is depicted as a contiguous block for the sake of clarity, it is understood that restricted memory may, in fact, be scattered throughout the memory 88. The only programs permitted access to the restricted memory 104 are those contained in the nub 96. As shown in FIG. 3, the nub 96 is preferably located within the restricted memory 104 to prevent unauthorized tampering with its code.

A restricted memory map 102 is stored within the restricted memory 104. In a preferred embodiment, the restricted memory map 102 contains an entry for each page of the memory 88. An entry indicates whether the page is designated as restricted memory and or not. For example, the entry may be a single bit, with "one" indicating the page is in restricted memory and "zero" indicating that the page is not in restricted memory. Alternatively, the restricted memory map 102 may contain entries only for those pages of the memory 88 that are located in the restricted memory 104. In the latter case, the mere presence of an entry for a page of the memory 88 may indicate that the page is located in the restricted memory 104. Other possible implementations of the restricted memory map include, but are not limited to: a list of page ranges, in which pages falling into one of the ranges are considered restricted; a base-bound pair, in which all pages above the base and below the bound are restricted; and a partition register that contains the address of the boundary between restricted and non-restricted pages.

The size of the restricted memory 104 may change as needed, and such changes may be reflected in the restricted memory map 102. As will be described below in further detail, a set of restrictions on access to the restricted memory 104 may be imposed on the CPU 70 and on the memory controller 114 of the computer system. The imposition of these restrictions depends, in part, on which program has control of the CPU 70.

In accordance with a preferred embodiment of the invention, the CPU 70 may be provided with a special operating mode, hereinafter referred to as a "restricted mode," which allows a program executing on the CPU 70 to access the restricted memory 104. To place the CPU into the restricted mode, a program may be required to pass through an authentication system such as that described in U.S. application Ser. No. 09/227,568 for a KEY-BASED SECURED STORAGE SYSTEM, which is incorporated herein by reference in its entirety. When operating in the restricted mode, the CPU 70 uses the trusted operating system programs of the nub 96.

Figure 4:
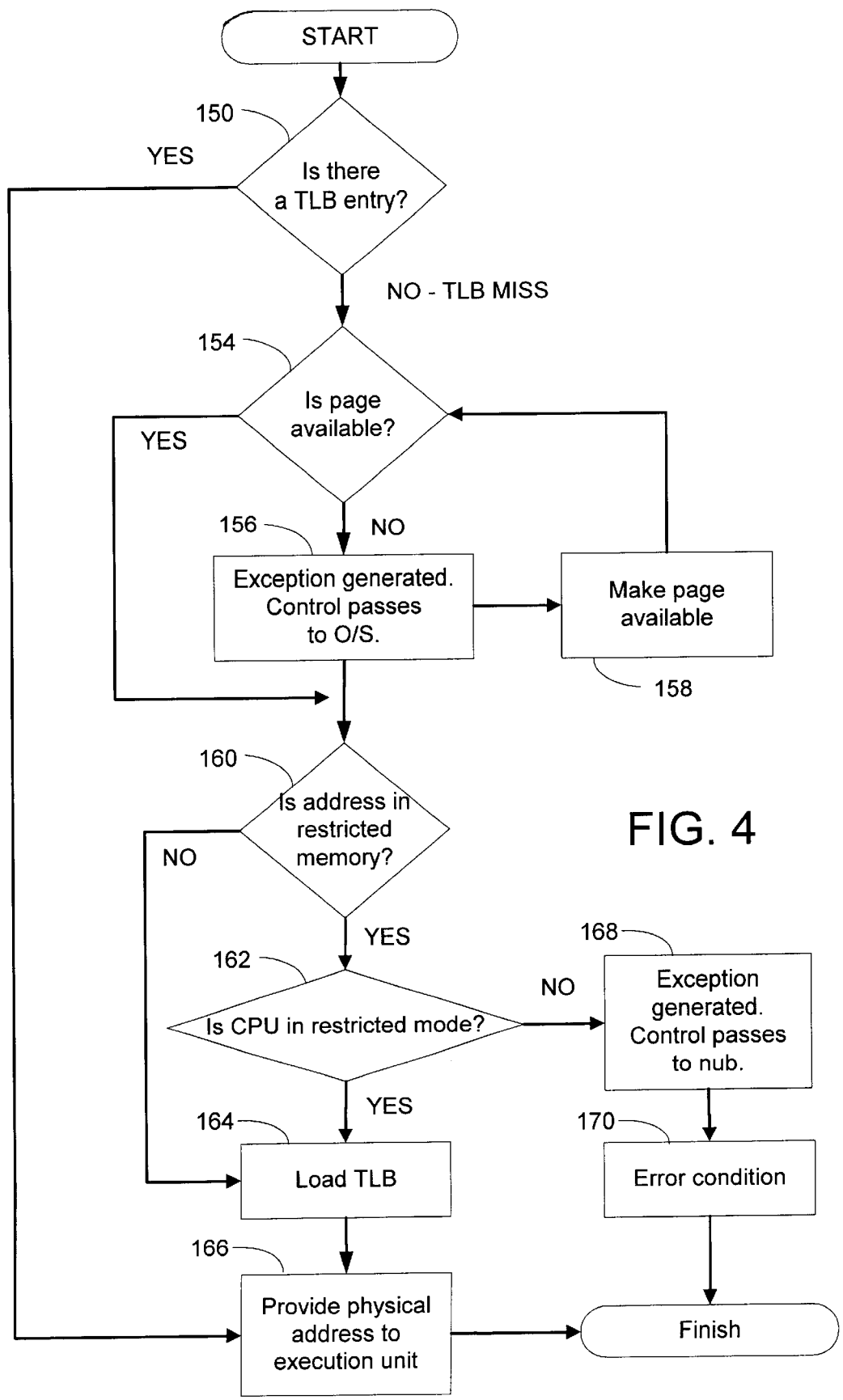
FIG. 4 is a flowchart generally illustrating the flow of logic followed during memory accesses in accordance with a preferred embodiment.

To prevent the execution unit 72 from gaining access to the restricted memory 104 while executing the instructions of an untrustworthy (i.e., non-nub) program, a preferred embodiment of the invention regulates access to restricted memory using the TLB-miss handler 78 as shown in the flowchart of FIG. 4. When the execution unit 72 needs to obtain instructions or data, it issues a request to the TLB 82 along with the virtual address of the desired data. The TLB 82 responds to the request by executing step 150 of the flowchart of FIG. 4. At step 150, the TLB 82 determines whether there is already a virtual-to-physical-page-number translation for the virtual address received from the execution unit 72. Since the TLB 82 is indexed by virtual page number, the TLB 82 simply looks for a TLB entry 84 corresponding to the virtual page number containing that virtual address. If there is such an entry, then at step 166 the TLB 82 provides the physical address to the execution unit 72. The execution unit 72 then conventionally retrieves the requested data using the physical address.

If there is no TLB entry 84 for that virtual address, then a "TLB miss" is said to have occurred, and the TLB 82 signals the TLB miss to the TLB miss handler 78. At step 154, the TLB miss handler 78 determines whether the page containing the data requested by the execution unit 72 is available. To make this determination, the TLB miss handler 78 attempts to locate the PTE 10 corresponding to the virtual page number. Locating the correct PTE may also involve a so-called "page table walk," in which the TLB miss handler 78 searches a succession of linked page tables. The TLB miss handler 78 may then look at the valid bit for the PTE 110. If the valid bit is one, thereby indicating that the page is available, then the TLB miss handler 78 proceeds to step 160.

If the valid bit is zero, then the flow of control passes to step 156 in which an invalid-page-fault exception occurs, and control is passed off to the operating system programs 94. The operating system programs 94 execute a page-fault handler at step 158 that makes the page available (such as by loading it into the memory 88), assigns the page a virtual address, and creates the appropriate PTE 110. Control then returns to the TLB-miss handler 78 at step 154. The TLB-miss handler 78 retrieves the physical page address for that page from the appropriate PTE 110 (whose valid bit is now one), and the flow of control proceeds to step 160.

At step 160, the TLB miss handler references the restricted memory map 102 to determine whether the retrieved physical address is located within the restricted memory 104. If the retrieved address is located within the restricted memory 104, then the TLB miss handler 78 performs step 162, in which it determines whether the CPU 70 is in the restricted mode, such as by examining a "restricted mode bit" of a register (not shown) of the CPU 70.

If the CPU 70 is in the restricted mode, then the TLB miss handler 78 proceeds to step 164 in which it creates an entry 84 for that physical address in the TLB 82 and indexes it with the virtual address. At step 166, the TLB miss handler 78 provides the physical address to the execution unit 72.

If the CPU 70 is not in restricted mode when there is a TLB miss for a page that is located in the restricted memory 104, then the TLB-miss handler 78 treats the request of the execution unit 72 as an attempt to gain unauthorized access to the restricted memory. The TLB-miss handler 78 then generates an exception, such as an invalid page fault, and passes control to the nub 96 at step 168. The nub 96 runs an exception handler which recognizes that an unauthorized attempt to gain access to the restricted memory 104 has occurred and generates an error code at step 170 to prevent the program currently in control of the CPU 70 from obtaining the physical address translation, thereby protecting the data at that address.

Since a TLB load operation takes a relatively long time to complete, requiring the TLB miss handler 78 to perform the extra step of referring to the restricted memory map 102 should not significantly affect the performance of the CPU 70. Also, the steps of FIG. 4 may be modified so that steps 160–170 are performed in parallel to steps 154–158. In other words, the TLB miss handler 78 may reference the restricted memory map 102 while the load is in progress. If it turns out that the CPU 70 is not in restricted mode and is attempting to access the restricted memory 104, then the TLB miss handler 78 may react by aborting the load and proceeding to step 168.

In some CPUs, such as the DEC ALPHA family of CPUs, the functions of the TLB miss handler 78 are implemented in software as part of the operating system. To implement the above-described TLB miss handler 78 on such a processor, the steps 154–164 of FIG. 4 are preferably implemented in the nub 96 of the operating system.

The instruction set of the CPU 70 may include one or more instructions that address physical memory directly and thus do not have to use the TLB 82. To further protect data in the restricted memory 104, it may be desirable to implement additional measures with respect to these instructions. For example, such instructions may be made available only to programs running in the nub 96 and only when the CPU 70 is in restricted mode. Alternatively, each physical memory access made using such instructions could be screened by referring to the restricted memory map 102 to determine whether the data requested are in restricted memory. If the data are in restricted memory, then the access attempt could be denied. Since the use of instructions that read physical memory on a system having a virtual addressing scheme is not very common, the cost in terms of processing speed of these additional security measures should be minimal.

To prevent an I/O device from gaining access to the restricted memory 104, the memory controller 114 may refer to the restricted memory map 102 in the same manner as the TLB miss handler 78 whenever the memory controller 114 receives a DMA request. If the restricted memory map 102 indicates that the requested address is in the restricted memory 102, then the memory controller may refuse the request for DMA. Thus, I/O devices attempting to access the restricted memory 104 may be required to pass through the CPU and consequently be regulated by the protection built into the TLB miss handler 78 as described above in conjunction with FIG. 4.

To prevent unauthorized programs from using TLB entries left over from authorized programs, the TLB 82 is preferably flushed when the CPU 70 switches from the restricted to the non-restricted mode.

In accordance with an aspect of a preferred embodiment of invention, the computer system cache, such as the cache 112, may be organized so that each block of data stored therein is indexed as a function of the physical address from which the data originated. Cache organized in this manner is said to be "physically tagged. " If the cache is not physically tagged, then it may be necessary to flush the cache whenever the CPU switches from restricted to non-restricted mode. This is to prevent data from the restricted memory 104 from being left over in the cache after the mode switch. If the cache is physically tagged so that no access to the cache is possible without going through the address translation of the TLB, then a flush operation may not be necessary.

In accordance with another aspect of a preferred embodiment of the invention, the contents of the computer system cache, such as the cache 112, and the memory 88 may be flushed when the CPU 70 is reset. This helps prevent a malicious user from stealing protected content that is left over from prior to the reset.

When the protection system described herein is implemented on a multiprocessor computer system, reads from and writes to memory may be accomplished as described in the previous sections. Each request for memory access by a non-nub program may be regulated as shown in the flowchart of FIG. 4. Additionally, each CPU will preferably have access to the same restricted memory location information. For example, each CPU may have its own copy of the restricted memory map. As long as the various copies of the restricted memory map are consistent with one another, and the CPUs are being regulated by a nub, such as the nub 96, the CPUs may "trust" one another to perform such operations as cache snoops and reads from memories of other CPUs. To insure that all copies of the restricted memory map are consistent with one another, the nub 96 may update the restricted memory map as follows.

To convert a page of non-restricted memory into restricted memory in response to a request from a CPU running in restricted mode, the nub 96 changes the appropriate entry of each CPU's restricted memory map and informs the CPUs that the update has occurred. To convert a page of restricted memory to non-restricted memory in response to a request from a CPU running in restricted mode, the nub 96 deletes the contents of the page, changes the appropriate entry of each CPU's restricted memory map, notifies the CPUs of the update, flushes all CPU and memory controller TLBs, and flushes all CPU and memory controller caches.

If the restricted memory map is implemented as a set of base and bound registers, then the nub 96 may perform the updating step described above by changing the appropriate value or values in those registers.

To inform the CPUs of a multiprocessor system that an update of the restricted memory map has occurred, the nub 96 may use a variety of mechanisms, including broadcasting a signal to the CPUs or using an inter-processor mechanism such as that used in the well known "TLB shootdown" procedure. Informing the CPUs of the update allows them to refresh their caches with an updated copy of the restricted memory map.

In view of the many possible embodiments to which the principals of this invention may be applied, it should be recognized that the embodiment described herein with respect to the drawing figures is meant to be illustrative only and should not be taken as limiting the scope of the invention. For example, the TLB-miss handler 78 of FIGS. 2 and 3 may be an integral part of the TLB 82, part of some other component of the CPU 70, or a software routine. Furthermore, the layout of the CPU 70 depicted in the figures has been highly simplified to help illustrate the invention. Chapters 1 and 2 of the "Intel Architecture Software Developer's Manual Vol. 1" (copyright 1999 by the Intel Corporation) and chapter 1 of the "Pentium® Processor Family Developer's Manual" (copyright 1996, 1997 by the Intel Corporation) each describe the architecture of exemplary CPUs in which this invention may be implemented and are incorporated by reference herein.

It should also be recognized that the ordering and the specific implementation of the steps described above and depicted in the flowchart of FIG. 4 may be altered in obvious ways.

Finally, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of protecting data in a computer system, the computer system comprising a cache, a central processing unit, a memory, and a translation lookaside buffer, the central processing unit having a restricted mode and an unrestricted mode, the method comprising:

designating an area of the memory as restricted;

storing the data in the restricted memory;

detecting a request from a program for an address of the data;

discovering that the requested address is not present in the translation lookaside buffer;

in response to the request, determining whether the requesting program is authorized to access the data;

if the requesting program is not authorized to access the data, then refraining from loading the requested address into the translation lookaside buffer; and flushing the translation lookaside buffer when the central processing unit switches from the restricted mode to the unrestricted mode to prevent an unauthorized program from accessing the data.

2. The method of claim 1, wherein the request is a direct memory access request.

3. The method of claim 1, wherein the cache is flushed in response to a reset of the central processing unit.

4. The method of claim 1, wherein the refraining step further comprises the step of generating an exception.

5. The method of claim 4, wherein the exception is an invalid page fault exception.

6. The method of claim 1, wherein the determining step further comprises reading a restricted memory map representing at least one address of the restricted memory.

7. The method of claim 1, wherein the determining step further comprises reading a register representing an address boundary of the restricted memory.

8. The method of claim 1, wherein the determining step further comprises reading at least one range of addresses representing a location of the restricted memory.

9. The method of claim 1, further comprising:

when a processor of the computer system updates a restricted memory map representing at least one address of the restricted memory, informing at least one other processor of the update.

10. The method of claim 1, further comprising:

if the requesting program is authorized to access the data, then loading the requested address into the translation lookaside buffer.

11. A method for restricting access to data on a computer system, the computer system having a restricted mode and an unrestricted mode, the method comprising:

(a) receiving a request for a translation of a virtual address into a physical address;

(b) translating the virtual address into the physical address;

(c) determining whether a memory represented by the physical address is restricted;

(d) if, based on step (c), the memory represented by the physical address is not restricted, then loading the physical address into a translation lookaside buffer;

(e) if, based on step (c), the memory represented by the physical address is restricted, then refraining from loading the physical address into the translation lookaside buffer; and (f) flushing the translation lookaside buffer when the computer system switches from the restricted mode to the unrestricted mode to prevent an unauthorized program from accessing the data.

12. The method of claim 11, wherein the request is a direct memory access request.

13. The method of claim 11, further comprising flushing a cache in response to a reset of a central processing unit.

14. The method of claim 11, wherein step (e) comprises generating an exception.

15. The method of claim 14, wherein the exception is an invalid page fault exception.

16. A computer-readable medium containing instructions for performing a method of protecting data in a computer system, the computer system comprising a cache, a central processing unit, a memory, and a translation lookaside buffer, the central processing unit having a restricted mode and an unrestricted mode, the method comprising:

designating an area of the memory as restricted;

storing the data in the restricted memory;

detecting a request from a program for an address of the data;

discovering that the requested address is not present in the translation lookaside buffer;

in response to the request, determining whether the requesting program is authorized to access the data;

if the requesting program is not authorized to access the data, then refraining from loading the requested address into the translation lookaside buffer; and flushing the translation lookaside buffer when the central processing unit switches from the restricted mode to the unrestricted mode to prevent an unauthorized program from accessing the data.

17. A computer-readable medium containing instructions for performing a method for restricting access to data on a computer system, the computer system having a restricted mode and an unrestricted mode, the method comprising:

(a) receiving a request for a translation of a virtual address into a physical address;

(b) translating the virtual address into the physical address;

(c) determining whether a memory represented by the physical address is restricted;

(d) if, based on step (c), the memory represented by the physical address is not restricted, then loading the physical address into a translation lookaside buffer;

(e) if, based on step (c), the memory represented by the physical address is restricted, then refraining from loading the physical address into the translation lookaside buffer; and (f) flushing the translation lookaside buffer when the computer system switches from the restricted mode to the unrestricted mode to prevent an unauthorized program from accessing the data.

* * * * *